US012541112B2

(12) United States Patent
Hatfield et al.

(10) Patent No.: US 12,541,112 B2
(45) Date of Patent: Feb. 3, 2026

(54) HEAD-MOUNTED DISPLAY UNIT WITH ADAPTABLE FACIAL INTERFACE

(71) Applicant: APPLE INC., Cupertino, CA (US)

(72) Inventors: Dustin A. Hatfield, Los Gatos, CA (US); Kristi E. Bauerly, Los Altos, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 18/801,997

(22) Filed: Aug. 13, 2024

(65) Prior Publication Data

US 2024/0402505 A1    Dec. 5, 2024

Related U.S. Application Data

(63) Continuation of application No. 18/229,282, filed on Aug. 2, 2023, now Pat. No. 12,111,478, which is a
(Continued)

(51) Int. Cl.
*G02B 27/01* (2006.01)
*G06F 1/16* (2006.01)

(52) U.S. Cl.
CPC ......... *G02B 27/0176* (2013.01); *G06F 1/163* (2013.01); *G02B 2027/0154* (2013.01)

(58) Field of Classification Search
CPC ........ G02B 27/0176; G02B 2027/0154; G02B 2027/0159; G02B 2027/0181; G06F 1/163; H04M 1/05
See application file for complete search history.

(56) References Cited

U.S. PATENT DOCUMENTS 6,388,640 B1    5/2002  Chigira et al.
9,128,283 B1    9/2015  Heinrich et al.
(Continued)

FOREIGN PATENT DOCUMENTS

CN    203870329 U    10/2014
CN    108345109 A    7/2018
(Continued)

OTHER PUBLICATIONS

International Search Report and Written Opinion mailed Oct. 30, 2020, in copending Intl Patent Application No. PCT/US2020/045173 (14 pp).

*Primary Examiner* — Matthew A Eason
*Assistant Examiner* — Chayce R Bibbee
(74) *Attorney, Agent, or Firm* — Young Basile Hanlon & MacFarlane, P.C.

(57) ABSTRACT

A facial interface for a head-mounted display, which is to be worn on a head of a user, includes a chassis, an upper portion, and a lower portion. The upper portion engages an upper facial region above eyes of the user. The lower portion engages a lower facial region below the eyes of the user. The lower portion includes a lower facial support. The lower facial support includes a rolling contact, a first arm, and a second arm. The rolling contact defines an axis. The first arm and the second arm are each coupled to the chassis and support the rolling contact. The rolling contact rotates about the axis relative to the first arm and the second arm to allow displacement of the lower facial support relative to the lower facial region of the user.

20 Claims, 9 Drawing Sheets

Related U.S. Application Data continuation of application No. 16/929,408, filed on Jul. 15, 2020, now Pat. No. 11,762,206.

(60) Provisional application No. 62/884,896, filed on Aug. 9, 2019.

(56) References Cited

U.S. PATENT DOCUMENTS

| | | |
|---|---|---|
| 9,176,325 B2 | 11/2015 | Lyons |
| 9,989,998 B1 | 6/2018 | Yee |
| 10,095,275 B2 | 10/2018 | Byun et al. |
| 10,256,859 B2 | 4/2019 | Fei et al. |
| 12,111,478 B2 | 10/2024 | Hatfield et al. |
| 2001/0047693 A1 | 12/2001 | Saito |
| 2018/0088310 A1 | 3/2018 | Hewlett et al. |
| 2018/0301802 A1 | 10/2018 | Elford et al. |
| 2019/0072772 A1 | 3/2019 | Poore et al. |
| 2019/0079301 A1 | 3/2019 | Sauers et al. |
| 2019/0137765 A1* | 5/2019 | Chang ............... G02B 27/0176 |

FOREIGN PATENT DOCUMENTS

| | | |
|---|---|---|
| CN | 109791292 A | 5/2019 |
| EP | 1619535 B1 | 2/2008 |
| JP | H11119148 A | 4/1999 |
| WO | 2017192996 A2 | 11/2017 |
| WO | 2018194325 A1 | 10/2018 |

* cited by examiner

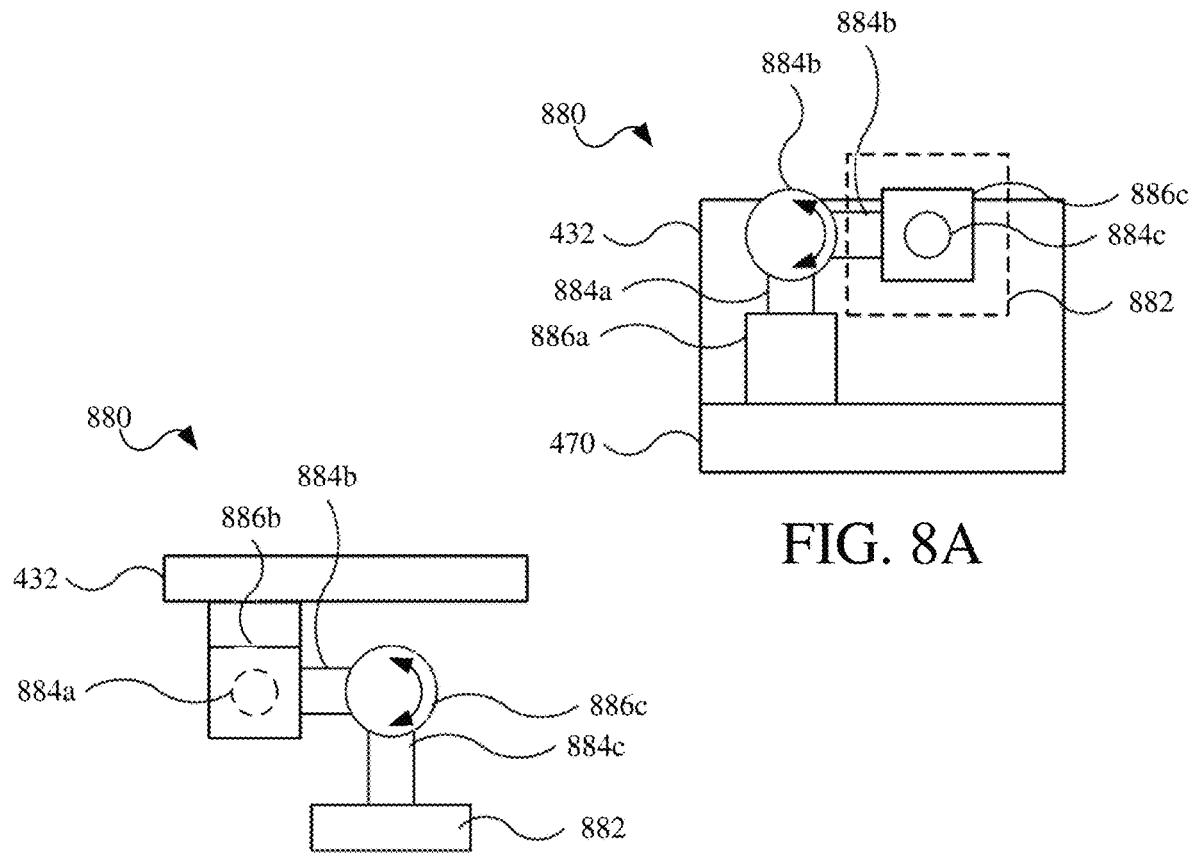
FIG. 8A
FIG. 8B
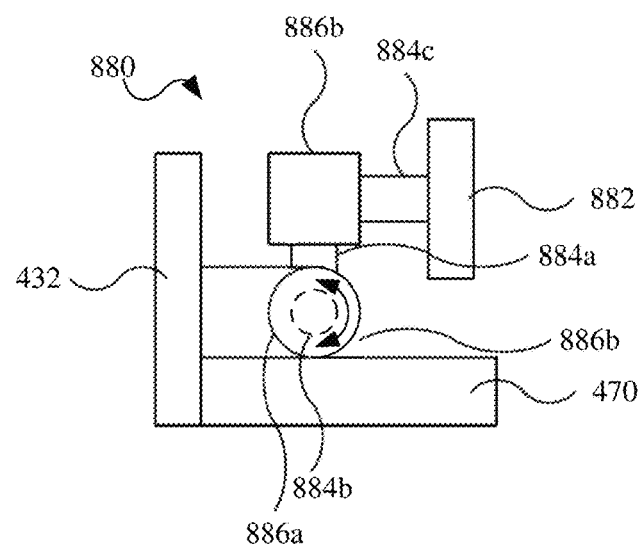
FIG. 8C

HEAD-MOUNTED DISPLAY UNIT WITH ADAPTABLE FACIAL INTERFACE

CROSS-REFERENCE TO RELATED APPLICATION(S)

This application is a continuation of U.S. patent application Ser. No. 18/229,282, filed Aug. 2, 2023, which is a continuation of U.S. patent application Ser. No. 16/929,408, filed Jul. 15, 2020, which claims the benefit of U.S. Provisional Application No. 62/884,896, filed Aug. 9, 2019, the contents of which are hereby incorporated herein in their entirety for all purposes.

TECHNICAL FIELD

This disclosure relates to head-mounted display units and facial interfaces therefor.

BACKGROUND

Head-mounted displays are worn on heads of user and engage the face thereof. However, by engaging the face, the head-mounted display may restrict facial movements and may additionally be moved by such facial movements.

SUMMARY

Disclosed herein are implementations of head-mounted displays and facial interfaces. In one implementation, a head-mounted display for being worn on a head of a user includes a display assembly and a facial interface. The display assembly includes a display. The facial interface is coupled to the display assembly for supporting the display assembly on a face of the user. The facial interface includes a first facial support that engages an upper facial region above eyes of the user and a second facial support that engages a lower facial region below the eyes of the user. In a reference position, in which the head-mounted display is worn on the head of the user and the user is upright and looking forward, a first vertical stiffness provided by the first facial support between the display assembly in a vertical direction and the upper facial region is greater than a second vertical stiffness provided by the second facial support between the display assembly and the lower facial region in the vertical direction.

The head-mounted display may further include a head interface coupled to the display assembly that engages the head of the user to support the display assembly, which in the reference position, may be in tension and compress the facial interface between the display assembly and the face of the user. The head-mounted display may further include a light seal that conforms to the face of the user and/or extend below the second facial support to block environmental light from reaching the eyes of the user, the light seal extending below the second facial support. In the reference position, a first fore-aft range of displacement provided by the first facial support between the display assembly and the upper facial region in a fore-aft direction may be greater than a second fore-aft range of displacement provided by the second facial support between the display assembly and the lower facial region in the fore-aft direction, a first fore-aft stiffness provided by the first facial support between the display assembly and the upper facial region in the fore-aft direction may be greater than a second fore-aft stiffness provided by the second facial support between the display assembly and the lower facial region in the fore-aft direction, and/or a first vertical range of displacement provided by the first facial support between the display assembly and the upper facial region in the vertical direction is less than a second vertical range of displacement provided by the second facial support between the display assembly and the lower facial region in the vertical direction. In the reference position, a first fore-aft force applied between the facial interface and the upper facial region in the fore-aft direction may be greater than a second fore-aft force applied between the facial interface and the lower facial region in the fore-aft direction, a first vertical force applied between the facial interface and the upper facial region in the vertical direction may be greater than a second vertical force applied between the facial interface and the lower facial region in the vertical direction, and/or a first ratio of the first vertical force to the first fore-aft force may be greater than a second ratio of the second vertical force to the second fore-aft force.

In an implementation, a facial interface for a head-mounted display, which is to be worn on a head of a user, includes an upper portion and a lower portion. The upper portion engages an upper facial region above eyes of the user. The lower portion that engages a lower facial region below the eyes of the user. The lower portion has a lower shear compliance in a first shear direction that is greater than an upper shear compliance of the upper portion in a second shear direction.

The facial interface may further include a light seal that engages a face below the lower portion. The lower portion may include a lower facial support having a pivot mechanism that provides the lower shear compliance, which may include one of an elongated roller, a spherical roller, or a multi-axis gimbal and a spring that provides normal compliance in a normal direction. The lower shear compliance may be greater than the upper shear compliance by having at least one of a lesser stiffness or a greater range of displacement. The lower portion may have a lower normal compliance in the normal direction that is greater than an upper normal compliance of the upper portion in the normal direction. The lower normal compliance may greater than the upper normal compliance by having at least one of a lesser stiffness or a greater range of displacement in the normal direction.

In an implementation, a head-mounted display is configured to be worn on a head of a user and includes a display assembly having a display and a facial interface coupled to the display assembly for supporting the display assembly on a face of the user. The facial interface includes a first facial support that engages an upper facial region above eyes of a user with a first stiffness, a second facial support that engages a lower facial region below the eyes of the user with a second stiffness, and a third facial support that engages a nose of the user with a third stiffness. The second stiffness is less than the first stiffness in a shear direction.

In an implementation, a head-mounted display for wearing on a head of a user includes a display assembly and a facial interface. The display assembly includes an electronic display. The facial interface is coupled to the display assembly and includes a pivot mechanism that engages a lower facial region below eyes of the user, which pivots relative to the display assembly to provide vertical compliance between the display assembly and the lower facial region.

The pivot mechanism may include a spring that provides normal compliance between the display assembly and the lower facial region. The head-mounted display may further include a compliant seal coupled to the display assembly and that engages the user below the pivot mechanism.

In an implementation, a facial interface for a head-mounted display to be worn on a head of a user includes a chassis, an upper portion that is coupled to the chassis and is configured to engage an upper facial region above eyes of the user, and a lower portion that includes a lower facial supported coupled to the chassis and configured to engage a lower facial region below the eyes of the user. The lower facial support includes a rolling contact that defines an axis, a first arm that is coupled to the chassis and supports the rolling contact, and a second arm that is coupled to the chassis and supports the rolling contact. The rolling contact is configured to rotate about the axis relative to the first arm and the second arm to allow displacement of the lower facial support relative to the lower facial region of the user.

In an implementation, a facial interface for a head-mounted display to be worn on a head of a user includes a chassis, an upper portion that is coupled to the chassis and configured to engage an upper facial region above eyes of the user, and a lower portion that includes a lower facial support coupled to the chassis and configured to engage a lower facial region below the eyes of the user. The lower facial support includes an arm, a pivot mechanism, and a selective stiffness device. The arm is coupled to the chassis and is moveable toward and away from the chassis. The pivot mechanism is supported by the arm and is configured to pivot in response to movement of the lower facial region of the user. The selective stiffness device is configured to selectively hinder movement of at least one of the pivot mechanism relative to the arms, and the pivot mechanism relative to the chassis.

In an implementation, a facial interface for a head-mounted display to be worn on a head of a user includes a display assembly, an upper portion that is coupled to the display assembly and is configured to engage an upper facial region above eyes of the user, and a lower portion that includes a lower facial support coupled to the display assembly and configured to engage a lower facial region below the eyes of the user. The lower facial support includes a selective stiffness device that is configured to selectively change a stiffness of the lower facial support. A controller is configured to operate the selective stiffness device to change the stiffness of the lower facial support based on an output from a sensor.

BRIEF DESCRIPTION OF THE DRAWINGS

In the drawings, dash-dash lines generally represent hidden components of a head-mounted display unit, dash-dot lines generally represent features or regions of a human, and dot-dot lines generally represent divisions between portions of components of the head-mounted display unit.

FIG. 8A is a rear view of another embodiment of a facial support for the facial interface of FIG. 4A.

FIG. 8B is a top view of the facial support of FIG. 8A.

FIG. 8C is a side view of the facial support of FIG. 8A.

DETAILED DESCRIPTION

Disclosed herein are embodiments of head-mounted display units and facial interfaces therefor, which are configured to comfortably distribute loading to the face of a user and properly position the head-mounted display relative to eyes of the user, even as changes to a shape of the face occur. For example, the facial interfaces disclosed herein are configured to engage regions of the face above and below the eyes (e.g., forehead and cheeks) to support the head-mounted display unit thereon and adapt to movements thereof, while limiting uncomfortable restriction to facial movements (e.g., smiling or other facial expressions) and limiting movement of the head-mounted display unit that might occur from such facial movement. In some embodiments of the facial interfaces discussed herein may provide greater loading to facial regions above the eyes than to below (e.g., in normal and/or shear directions) and have lesser compliance in portions above the eyes than in below (e.g., in normal and/or shear directions).

Figure 1A:
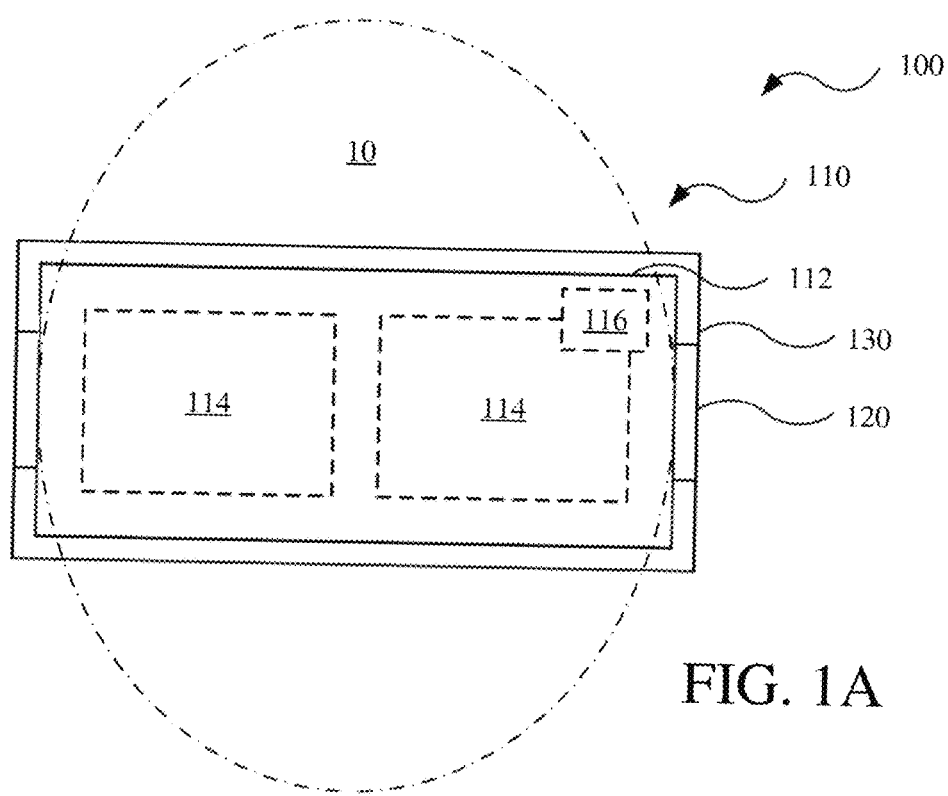
FIG. 1A is a front view of a head-mounted display unit on a head of a user.
Figure 1B:
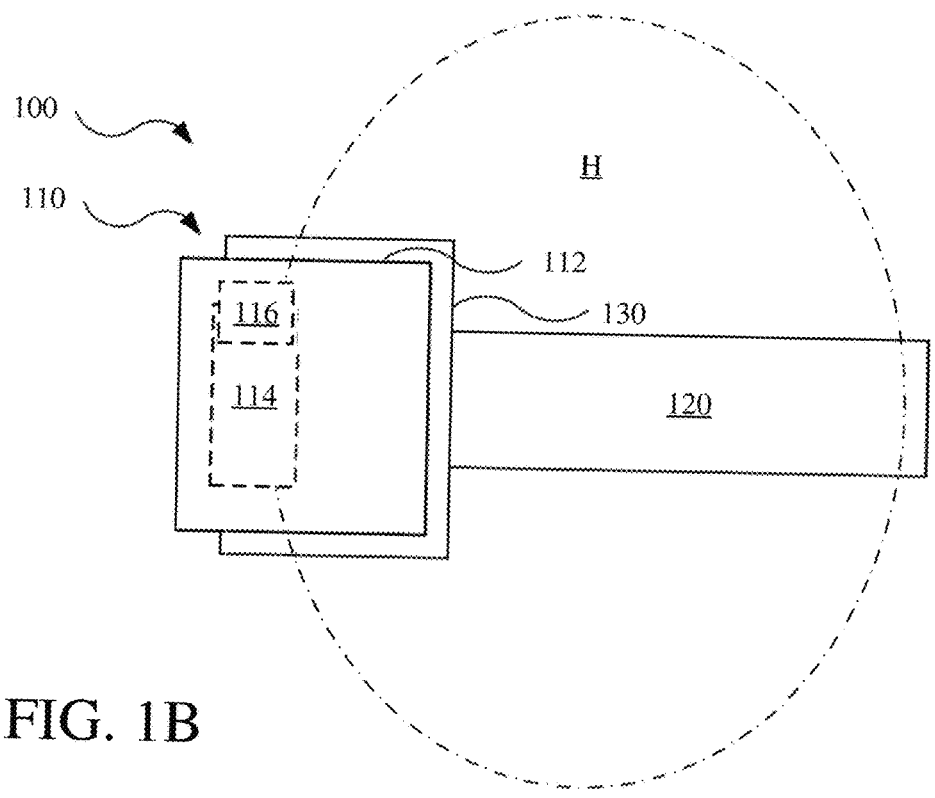
FIG. 1B is a side view of the head-mounted display unit on the head.

Referring to FIGS. 1A-1B, a head-mounted display unit 100 generally includes a display assembly 110, a head interface 120, and a facial interface 130. The head-mounted display unit 100 may, for example, display content of a computer-generated reality environment to a user (as discussed in further detail below).

The display assembly 110 includes a housing 112, one or more electronic displays 114, and may further include other electronics 116. The housing 112 is the primary structure of the display assembly 110, for example, forming a chassis to which the electronic display 114 and the other electronics 116 are coupled. The electronic display 114 is of any suitable type (e.g., liquid crystal ("LCD"), light-emitting diode ("LED"), micro-LED, organic light-emitting (OLED), suitable projector and reflector). The other electronics 116 may include one or more sensors (e.g., eye sensors, such as eye cameras, and position sensors), power electronics, and a controller or other processing device, which work in conjunction with the electronic display 114 to provide content to the user.

The head interface 120 is coupled, fixedly or removably, to the display assembly 110 and engages the head 20 of the user to support the display assembly 110, including the electronic display 114, in suitable position relative to eyes of the user for displaying the graphical content to the user. The head interface 120 may, for example, be configured as an adjustable band (e.g., elastic, sprung, and/or mechanical adjustment) that extends between left and right sides of the display assembly 110 around the head 20 of the user. The head interface 120 may, instead or additionally, extend over a top of the head 20 of the user.

The facial interface 130 is coupled, fixedly or removably, to the display assembly 110 and engages the face 10 of the user to support the display assembly 110 in suitable position relative to eyes of the user for displaying the graphical content thereto with the electronic display 114 and/or for sensing the eyes with an eye sensor (e.g., camera or other sensor of the electronics 116). The face 10 is generally considered the forward portion of a head 20 of the user. For example, the facial interface 130 may be configured to position the electronic display 114 in a predefined region, such as a one cubic centimeter volume, smaller or larger, relative to the eye of the user. The facial interface 130 may also include or otherwise function as a light seal, which bocks environmental light from reaching the eyes of the user. Further details of the facial interface 130 and different features and/or embodiments are discussed in further detail below.

Figure 2A:
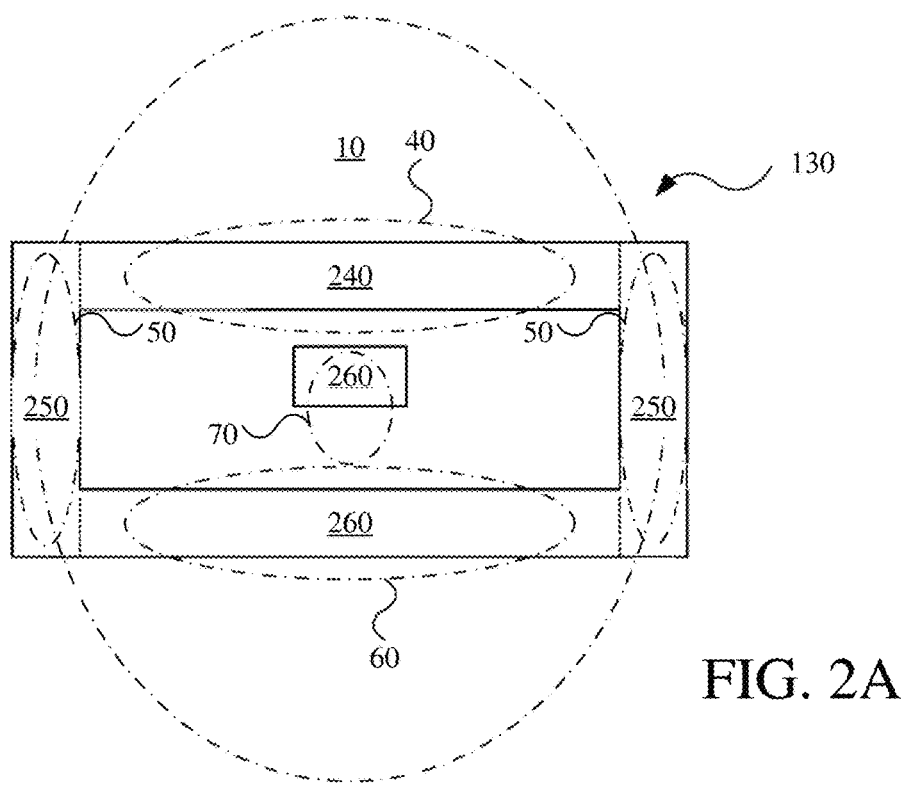
FIG. 2A is a front view of a facial interface of the head-mounted display unit of FIG. 1A interfacing with facial engagement regions of the head.
Figure 2B:
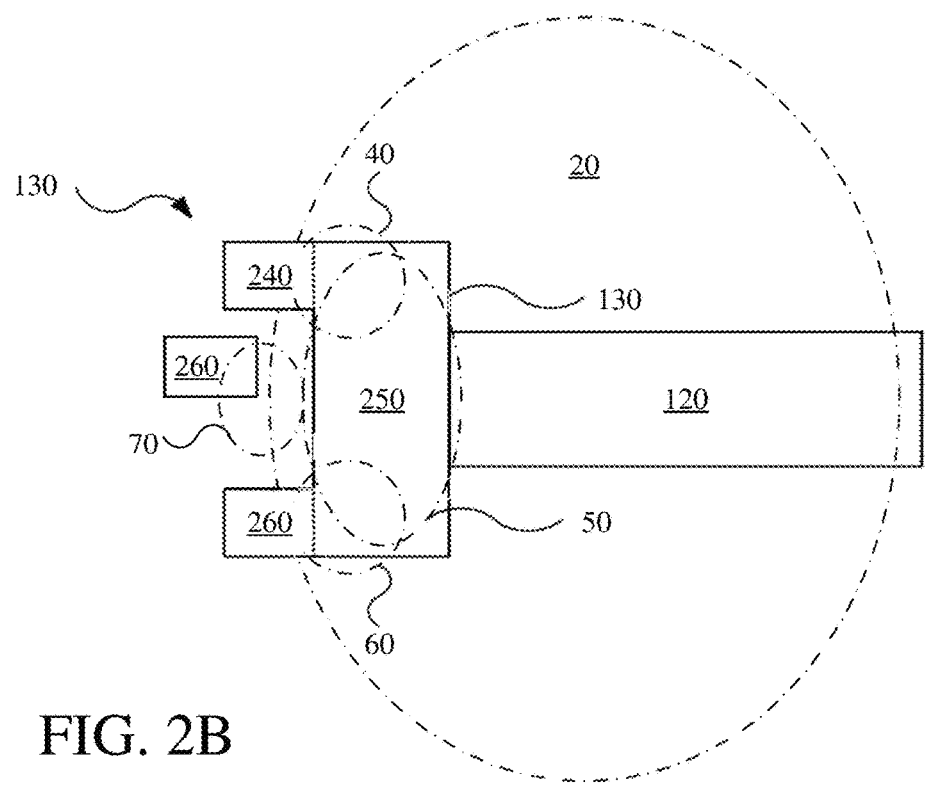
FIG. 2B is a side view of the facial interface of FIG. 2A and a head interface interfacing with the facial engagement regions of the head.

Referring additionally to FIGS. 2A-2B, the facial interface 130 is illustrated without the display assembly 110. The facial interface 130 includes an upper portion 240, side portions 250, and a lower portion 260, which generally correspond to and engage various facial regions of the user. The upper portion 240 engages an upper facial region 40 of the face 10 of the user, which is above the eyes of the user, such as a forehead or brows. The side portions 250 engage side facial regions 50 of the face 10 of the user, which are to sides of the eyes of the user, such as along the temples of the user. The lower portion 260 engages a lower facial region 60 of the face 10 of the user, which is below the eyes of the user, such as the cheeks. The upper portion 240, the side portions 250, and the lower portion 260 may cooperatively surround the eyes of the user to block environmental light from reaching the eyes of the user. In some implementations, the facial interface 130 may further include a central portion 270 (e.g., a nasal portion). The central portion 270 engages a central facial region 70 of the face 10 of the user, such as the nose of the user, which may be referred to as a nasal region.

Figure 3A:
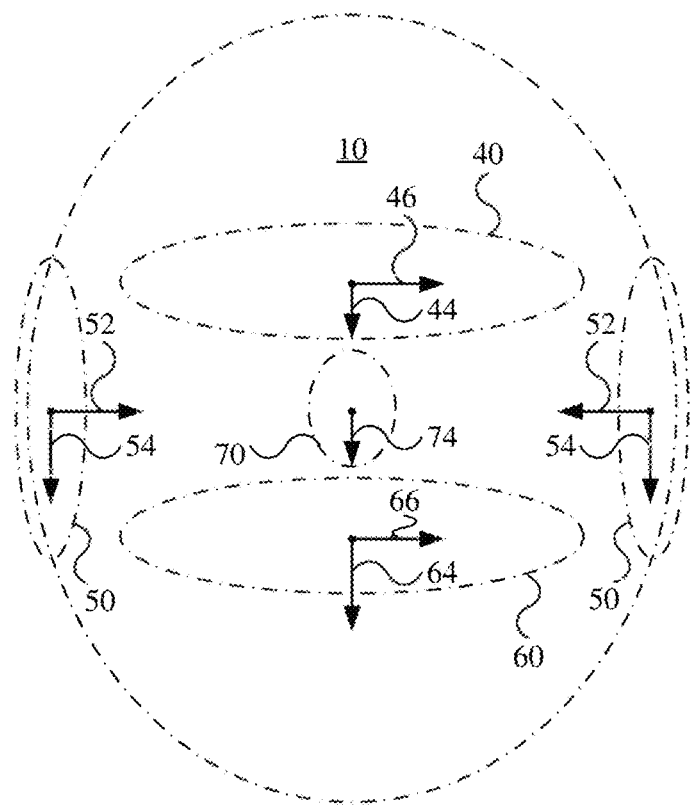
FIG. 3A is a front view of the head and forces applied by the facial interface to the facial engagement regions.
Figure 3B:
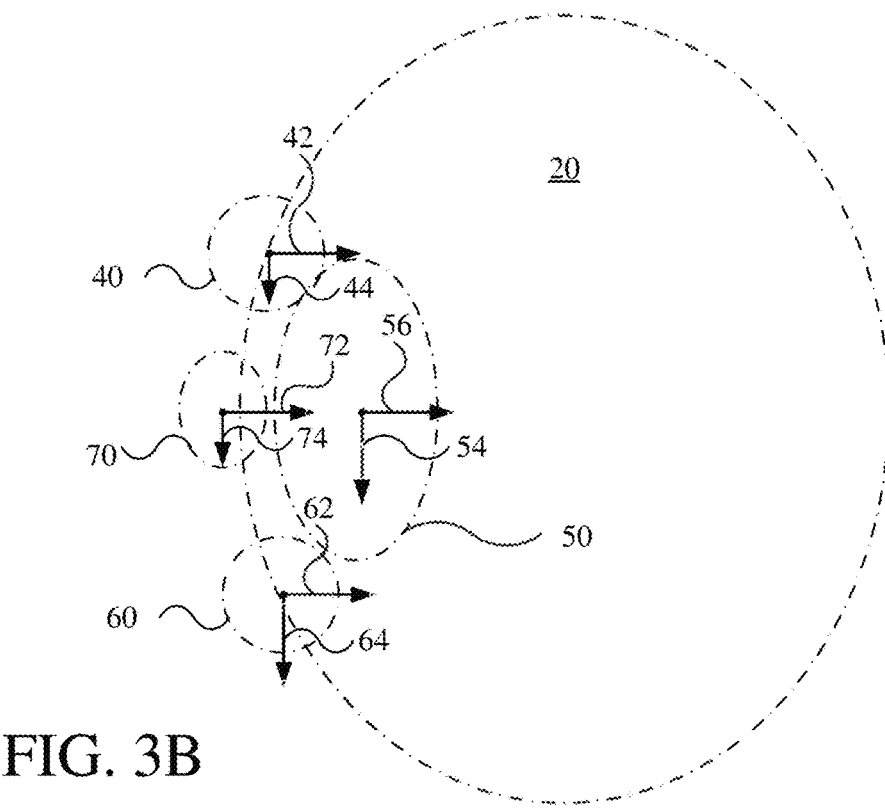
FIG. 3B is a side view of the head and the forces applied by the facial interface to the facial engagement regions.

Referring to FIGS. 3A-3B, in a reference position, the facial interface 130 distributes loading from the display assembly 110 to the various regions of the face 10. The reference position is defined as the user's head being generally upright and facing forward with the head-mounted display unit 100 being worn thereon for displaying content to the user. In the reference position, the head-mounted display unit 100 and the facial interface 130 may be considered to be in an upright orientation. The static loading arises from weight of the head-mounted display unit 100 (e.g., weight of the display assembly 110 and the facial interface 130) and tension of the head interface 120 pulling the display assembly 110 and the facial interface 130 toward the face 10 of the user. The static loading distributed to the various regions of the face 10 may be expressed as a normal component (i.e., generally perpendicular to a surface or structure of the region of the face 10) and one or more shear components (i.e., generally parallel with the surface or structure of the region of the face 10), such as vertical and horizontal shear components. It should be noted that the upper facial region 40 (e.g., the forehead and/or brows) and the lower facial region 60 (e.g., the cheeks) are generally vertical and forward-facing (i.e., in the fore-aft direction), such that the normal direction and the vertical shear direction relative to the upper facial region 40 and the lower facial region 60 may also be referred to as the fore-aft direction and the vertical direction, respectively. The central facial region 70 (e.g., the nose or bridge of the nose) is generally tilted rearward relative to the upper facial region 40 and/or the lower facial region 60, such that the normal direction and the shear direction relative to the central facial region 70 are angled downward and forward relative to those in the upper facial region 40 and the lower facial region 60, respectively, and/or to the fore-aft and vertical directions, respectively. The normal direction and the shear directions may also be considered relative to the facial interface 130, for example, being defined relative to surfaces of the upper portion 240, the lower portion 260, and the central portion 270, or structures or mechanisms thereof, that engage the face 10.

At the upper facial region 40, the static loading includes force components of an upper normal force 42 (i.e., applied in the normal direction, which is horizontal and predominantly fore-aft), an upper vertical shear force 44 (i.e., applied in the vertical shear direction, which is generally vertical), and an upper horizontal shear force 46 (i.e., applied in the horizontal shear direction, which is horizontal and predominantly left-to-right). For each of the side facial regions 50, the static loading includes force components of a side normal force 52 (i.e., applied in the normal direction, which is generally horizontal and largely left-to-right), a side vertical shear force 54 (i.e., applied in the vertical shear direction, which is generally vertical), and side horizontal shear force 56 (i.e., applied in the horizontal shear direction, which is horizonal and largely fore-aft). For the lower facial region 60, the static loading includes force components of a lower normal force 62 (i.e., applied in the normal direction, which is generally horizontal and predominantly fore-aft), a lower vertical shear force 64 (i.e., applied in the vertical shear direction, which is generally vertical), and a lower horizontal shear force 66 (i.e., applied in the horizontal shear direction, which is horizontal and predominantly left-to-right). For the central facial region 70, the static loading includes force components of a central normal force 72 (i.e., applied in the normal direction, which at a front of the central facial region 70 of the face 10, is predominantly rearward and partially downward) and a central vertical shear force 74 (i.e., applied in the vertical shear direction, which is predominantly downward and partially forward). Due to the shaping of the bridge of the nose in the central facial region 70, horizontal shear force may be generally negligible, while further normal forces (not illustrated) may be applied in predominantly lateral directions (e.g., left-to-right) against the nose.

The force components of the static loading are illustrated in a consolidated manner as point loads, but it should be understood that such forces are distributed over surfaces of the face of the user and may occur in slightly other directions depending on the contours of the facial regions of the user. In one example, the lower force components (i.e., to the lower facial region 60) may be divided between left and right sides, for example, as left and right segments of the lower portion 260 of the facial interface apply force to left and right subregions of the lower facial region 60. Furthermore, because the upper facial region 40 and the lower facial region 60 are generally vertical and forward-facing, the normal forces 42, 62 may, as referenced above, occur generally in the fore-aft direction and be referred to as fore-aft forces, and the vertical shear forces 44, 64 may, as referenced above, occur generally in the vertical direction and be referred to as vertical forces (e.g., upper fore-aft force 42, lower fore-aft force 62, upper vertical shear force 44, and lower vertical shear force 64). Because the shape of the nose of the central facial region 70 is tilted rearward relative to the upper facial region 40 and the lower facial region 60, the central normal force 72, as referenced above, occurs predominantly rearward and partially downward and be referred to as a predominantly rearward force, and the central vertical shear force 74 occurs predominantly downward and partially forward and may be referred to as a predominantly vertical force. Additionally, to distinguish between the various upper and lower forces, such forces may instead be identified numerically (e.g., first, second, etc.).

The upper portion 240 and the lower portion 260, as well as the central portion 270 (if provided), are cooperatively configured to provide comfort to the user and/or reliable positioning of the display assembly 110 relative to the eyes of the user by accounting for and/or taking advantage of the different physiological makeups of the upper facial region 40 and the lower facial region 60 of the face 10 of the user. More particularly, the upper facial region 40 includes bony structures of the forehead and/or brows with relatively little soft tissue thereover, such as muscle and/or fatty tissue. As a result, the upper facial region 40 may form a relatively large and stable reference point (e.g., datum) that the facial interface 130 engages to locate the display assembly 110 relative to the eyes of the user. In contrast, the lower facial region 60 includes more soft tissues, such as muscle tissue (e.g., the zygomaticus and the levator labii superioris muscles) and fatty tissue over bony structures. Thus, as compared to the upper facial region 40, the lower facial region 60 may be less comfortable to the user to support significant loading and/or be more prone to changes of shape of the face 10 (e.g., when smiling or making other facial expressions) that may cause movement of the head-mounted display unit 100.

The central facial region 70 includes bony structures of the nose bridge with relatively little soft tissue thereover. Due to the smaller size of the central facial region 70 relative to the upper facial region 40, the central facial region 70 may be less comfortable to the user to support significant loading as compared to the upper facial region 40, while the being less prone to changes of shape of the face 10 than the lower facial region 60 (e.g., when smiling or making other facial expressions) that may cause movement of the head-mounted display unit 100. As a result, the central facial region 70 may form a relatively small (as compared to the upper facial region 40) and stable reference point (e.g., datum) that the facial interface 130 may engage to further locate the display assembly 110 relative to eyes of the user.

The upper portion 240 and the lower portion 260, as well as the central portion 270, may be cooperatively configured in various manners, including according to distribution of normal loading (i.e., in the normal direction), normal compliance (i.e., in the normal direction), distribution of shear loading (i.e., in one or more shear directions), and shear compliance (e.g., in the vertical shear direction).

Regarding normal loading, the upper portion 240 and the lower portion 260 of the facial interface 130, along with the head interface 120, may be configured for the upper facial region 40 of the face 10 of the user to bear significantly more of the normal loading than the lower facial region 60 of the face 10. By distributing more normal force to the upper facial region 40, which has less soft tissue and is less susceptible to facial movements, and less normal force to the lower facial region 60, which has more soft tissue and is more susceptible to facial movements, the user may experience greater comfort and the display assembly 110 may be more reliably positioned.

The upper normal force 42 applied by the upper portion 240 of the facial interface 130 to the upper facial region 40, which may result predominantly from the tension of the head interface 120, may be significantly greater than the normal force 62 applied by the lower portion 260 of the facial interface 130 to the lower facial region 60 (e.g., being two, three, four, or more times greater). For example, the upper portion of the facial interface 130 may engage the upper facial region 40 to form a pivot point about which a moment is generated by tension of the head interface 120 and weight of the display assembly 110. The lower normal force 62 counters the moment so generated.

Regarding normal compliance, compliance of the upper portion 240 of the facial interface 130 in the normal direction, which may be referred to as upper normal compliance, is lesser than compliance of the lower portion 260 in the normal direction, which may be referred to as lower normal compliance, for example, by having greater stiffness and/or a lesser range of displacement. The range of displacement is the distance over which the upper portion 240 or the lower portion 260 are compressed from a relaxed state to a fully-compressed state. With the upper portion 240 having less compliance, relatively little movement may occur between the upper portion 240 (or an upper part of the display assembly 110) and the upper facial region 40, whereby the upper facial region 40 functions as a reliable datum relative to which the display assembly 110 is consistently positioned. With the lower portion 260 having relatively high compliance, the lower portion 260 may adapt for movements of the lower facial region 60 (e.g., cheeks), which are often more pronounced than those of the upper facial region 40, both providing comfort by limiting restriction against movements of the lower facial region 60 and providing reliable positioning of the display assembly 110 by conforming to such facial movements.

For example, the upper portion 240 may have a stiffness (e.g., compressibility) in the normal direction, which may be referred to as the upper normal stiffness, that is greater than a stiffness of the lower portion 260 in the normal direction, which may be referred to as the lower normal stiffness (e.g., being two, three, four, or more times stiffer). Thus, the lower portion 260 may be considered as having lesser stiffness than the upper portion 240. Instead or additionally, the upper portion 240 may have a range of displacement in the normal direction (e.g., axial displacement), which may be referred to as the upper normal range of displacement, that is relatively low compared to a range of displacement of the lower portion 260, which may be referred to as the lower normal range of displacement (e.g., having 75%, 50%, or 25% or less of the range of displacement of the lower portion 260). Thus, the lower portion 260 may be considered as having greater range of displacement than the upper portion 240. Because the upper facial region 40 and the lower facial region 60 are generally vertical and forward-facing, the normal compliance of the upper portion 240 and the lower portion 260 or structures and mechanism thereof (discussed below) may be referred to as fore-aft compliance (e.g., the upper fore-aft compliance, upper fore-aft stiffness, upper fore-aft range of displacement, lower fore-aft compliance, lower fore-aft stiffness, lower fore-aft range of displacement). Additionally, to distinguish between the various upper and lower compliance, such compliance may instead be identified numerically (e.g., first, second, etc.).

Compliance of the central portion 270 of the facial interface 130 in the normal direction, which may be referred to as central normal compliance, may be different than each of the upper normal compliance (e.g., greater or lesser than) and the lower normal compliance (e.g., lesser than). With the central portion 270 having less compliance than the lower portion 260, relatively little movement may occur between the central portion (or a central part of the display assembly 110, such as the electronic display 114) and the central facial region 70 (e.g., the nose or nose bridge), whereby the central facial region 70 functions a reliable datum relative to which the display assembly 110 may be consistently positioned. In combination with the upper portion 240 also having less compliance than the lower portion 260, both the upper facial region 40 and the central facial region 70 may function as reliable datums relative to which the display assembly 110 may be both consistently positioned and consistently oriented (e.g., pitch angle of the electronic display 114 and an optical axis of the eye of the user). For example, the central normal compliance may be less than both the upper normal compliance and the lower normal compliance (e.g., greater stiffness and/or lesser range of displacement), or greater than the upper normal compliance (e.g., lesser stiffness and/or greater range of displacement) and less than the lower normal compliance (e.g., greater stiffness and/or lesser range of displacement).

For example, the central portion 270 may have a stiffness (e.g., compressibility) in the normal direction, which may be referred to as the central normal stiffness, that is greater than the lower normal stiffness (e.g., being two, three, four, or more times stiffer). Thus, the lower portion 260 may be considered as having lesser stiffness than the central portion 270. Instead or additionally, the central portion 270 may have a range of displacement in the normal direction (e.g., axial displacement), which may be referred to as the central normal range of displacement, that is relatively low compared to the lower normal range of displacement (e.g., having 75%, 50%, or 25% or less of the range of displacement of the lower portion 260). Thus, the lower portion 260 may be considered as having greater range of displacement than the central portion 270.

Regarding shear loading, the upper portion 240 and the lower portion 260 of the facial interface 130 may be configured for the upper facial region 40 of the face 10 of the user to bear significantly more of the vertical shear loading than the lower facial region 60 of the face 10. The shear loading arises from the weight of the display assembly 110. The relatively low vertical shear loading to the lower facial region 60 may provide low restriction to movement of the lower facial region 60 (e.g., when smiling or making other facial expressions), which may in turn provide comfort to the user.

The relative shear loading may be quantified in different manners, such as in absolute terms (e.g., pounds or newtons) or relative terms (e.g., as ratios relative to weight, each other, and/or to the normal loading). In relative terms to the weight of the head-mounted display unit 100, the upper vertical shear force 44 may be a majority of the weights of the display assembly 110 and the facial interface 130 (e.g., 50%, 60%, or more) or a substantial majority thereof (e.g., 70%, 80%, 90% or more), while the lower vertical shear force 64 provides the balance thereof and/or may be negligible (e.g., near zero). In terms relative to each other, the upper vertical shear force 44 applied by the upper portion 240 of the facial interface to the upper facial region 40 is significantly greater than the lower vertical shear force 64 applied by the lower portion 260 of the facial interface to the lower facial region, for example, being three, four, five, six, seven, eight, or more times greater. In relative terms to the normal force, a ratio of the upper vertical shear force 44 to the upper normal force 42, which may be referred to as the upper vertical shear/normal force ratio, is greater than a ratio of the lower vertical shear force 64 to the lower normal force 62, which may be referred to as the lower vertical shear/normal force ratio. The upper vertical shear/normal force ratio may, for example, be two, three, four, or more times greater than the lower vertical shear-normal force ratio. In terms other terms relative to the normal forces, a ratio of the lower normal force 62 to the upper normal force 42, which may be referred to as the normal vertical force ratio, is greater than a ratio of the lower vertical shear force 64 to the upper vertical shear force 44, which may be referred to as the shear vertical force ratio. The normal vertical force ratio may, for example, be two, three, four, or more times greater than the shear vertical force ratio. The ratios described may quantify or otherwise illustrate that the lower portion 260 is less resistant to vertical movement of the lower facial region 60 than is the upper portion 240 to vertical movement of the upper facial region 40.

Regarding shear compliance, shear compliance of the upper portion 240 in the vertical shear direction, which may be referred to as upper vertical shear compliance, is less than shear compliance of the lower portion 260 of the facial interface 130 in the vertical shear direction, which may be referred to as lower vertical shear compliance. For example, the upper portion 240 may have greater stiffness than the lower portion 260 in the shear direction (e.g., being two, three, four, or more times stiffer). Thus, the shear stiffness provided by the upper portion 240 between the display assembly 110 and the upper facial region 40 in the vertical direction, which may be referred to as the upper vertical shear stiffness, is greater than the shear stiffness provided by the lower portion 260 between the display assembly 110 and the lower facial region in the vertical direction, which may be referred to as the lower vertical shear stiffness. Instead or additionally, the upper portion 240 may have a range of displacement in the vertical shear direction, which may be referred to as the upper shear range of displacement, that is less than a range of displacement of the lower portion 260 in the vertical shear direction, which may be referred to as the lower shear range of displacement (e.g., having 75%, 50%, 25% or less).

The relatively high vertical shear compliance of the lower portion 260 may provide low restriction to movement of the lower facial region 60 (e.g., when smiling or making other facial expressions), which may in turn provide comfort to the user, and may conform to movements of the lower facial region 60 to limit movement of the display assembly 110 relative to the eyes of the user. Because the upper facial region 40 and the lower facial region 60 are generally vertical and forward-facing, the shear compliance of the upper portion 240 and the lower portion 260 or structures and mechanism thereof (discussed below) generally occur in the vertical direction and may be referred to as vertical compliance (e.g., the upper vertical compliance, upper vertical stiffness, upper vertical range of displacement, lower vertical compliance, lower vertical stiffness, lower vertical range of displacement). Additionally, to distinguish between the various upper and lower compliance, such compliance may instead be identified numerically (e.g., first, second, etc.).

The upper vertical shear compliance may also be less than the shear compliance of the central portion 270 of the facial interface 130 in the vertical shear direction, which may be referred to as central vertical shear compliance. For example, the upper portion 240 may have greater stiffness than the central portion 270 in the shear direction (e.g., being two, three, four, or more times stiffer). Thus, the upper vertical shear stiffness may be greater than the shear stiffness provided by the central portion 270 between the display assembly 110 and the central facial region (e.g., the nose or nose bridge) in the vertical direction, which may be referred to as the central vertical shear stiffness. Instead or additionally, the upper shear range of displacement may be less than a range of displacement of the central portion 270 in the vertical shear direction, which may be referred to as the central shear range of displacement (e.g., having 75%, 50%, 25% or less).

The relatively high vertical shear compliance of the central facial portion 270 may provide relatively low vertical loading on the central facial region 70, as compared to the upper portion 240 on the upper facial region 40, which might otherwise result in users experiencing high pressure in the central facial region 70 due to the relative small area of the central facial region 70 (e.g., the nose bridge) as compared to the upper facial region 40 (e.g., the forehead).

While discussed with respect to the vertical shear properties of the upper portion 240 and the lower portion 260 of the facial interface 130, the shear properties of the lower portion 260 may vary in different shear directions. For example, the lower portion 260 may be configured to have relatively high shear loading and/or low shear compliance in the horizontal direction (e.g., to provide lateral stability of the display assembly 110 as the user moves their head 20). In another example, the lower portion 260 may be configured to have relatively low shear loading and/or high shear compliance in directions relative to facial regions (e.g., the zygomaticus and/or the levator labii superioris muscles), such as having high shear compliance along the structure or muscle and low shear compliance perpendicular thereto, or vice versa. Thus, compliance (e.g., stiffness and/or range of displacement) of the upper portion 240 and the lower portion 260 in any shear direction may be referred to, respectively, as a lower shear compliance and an upper shear compliance.

Figure 4A:
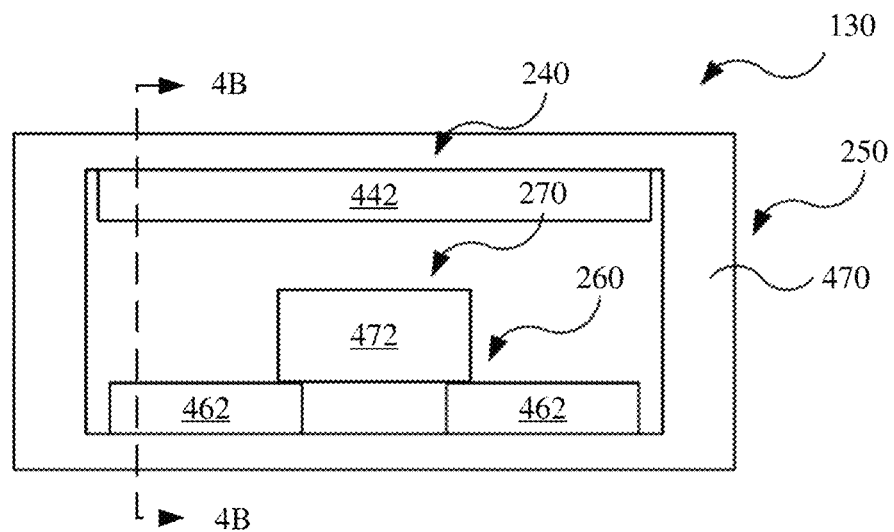
FIG. 4A is a front view of the facial interface of FIG. 2A.
Figure 4B:
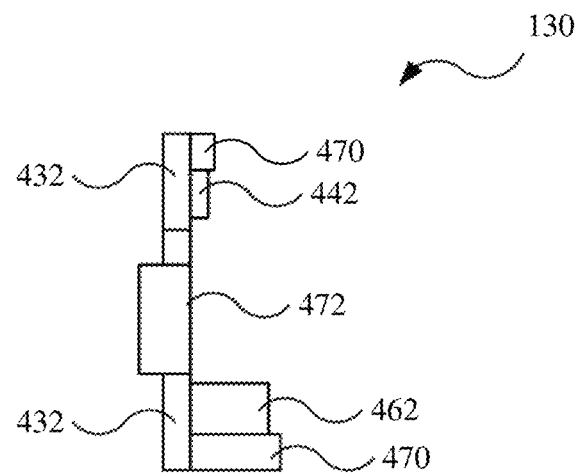
FIG. 4B is a cross-sectional view of the facial interface taken along line 4B-4B in FIG. 4A.

Referring to FIGS. 4A-4B, the upper portion 240 and the lower portion 260, as well as the central portion 270, of the facial interface 130 may include various materials, mechanisms, and/or structures to achieve the configurations force distribution and compliance described above. The upper portion 240 of the facial interface 130 includes one or more upper facial supports 442, which are formed with the sprung load spreader 780 (described below) and/or one or more layers of compliant material that engage the upper facial region 40 and conform thereto and provide the relative loading and stiffness characteristics described above. The springs of the sprung load spreader 780 may have higher compliance (e.g., lower stiffness) in the normal direction than in the shear direction. The compliant material of the upper facial support 442 may include layers of a foam, elastomer (e.g., silicone), and/or woven fabric that conform to the shape of the upper facial region 40 by compressing in the normal direction thereto and/or by flexing along the contours thereof. In other examples, the one or more upper facial supports 442 may be configured as one of the other types of support mechanisms described below. The upper facial support 442 may be coupled to a chassis 432 (e.g., frame or plate) of the facial interface 130, which in turn couples or otherwise connects to the display assembly 110, or may be coupled directly to the housing 112 of the display assembly 110. The upper facial support 442 of the upper portion 240 may be provided as a singular assembly that continuously engages the upper facial region 40 (as shown) or may be divided into distinct segments or otherwise engage the upper facial region 40 in distinct regions (e.g., the right and left brows or regions thereabove).

The lower portion 260 of the facial interface 130 includes one or more lower facial supports 462 (depicted schematically) that engage the lower facial region 60. For example, as shown, the lower portion 260 includes two of the facial supports 462 (e.g., left and right ones of the lower facial supports 462, which engage left and right cheek regions, respectively, of the face 10 of the user). The lower portion 260 may include further facial supports 462, for example, having two or more of the lower facial supports 462 that engage each of the left and right cheeks of the face 10 of the user (e.g., having four or more of the lower facial supports 462). The facial supports 462 may be coupled to the chassis 432 of the facial interface 130 or may be coupled, individually or cooperatively, directly to the display assembly 110. Different embodiments of the facial supports 462 are discussed in further detail below.

The central portion 270 of the facial interface 130 includes one or more central facial supports 472 (depicted schematically) that engage the central facial region 70. The central facial support 472 may be described as above for the upper facial supports (e.g., being configured as the sprung load spreader 780 and/or the compliant material, and/or one of the support mechanisms described below). The central facial support 472 may be coupled to the chassis 432 of the facial interface 130 or may be coupled, individually or cooperatively, directly to the display assembly 110.

The upper facial support 442, the lower facial support 462, and the central facial support 472 may be provided in any suitable combinations of types (e.g., one, two, or three different types), for example, such types being selected from a group consisting of the sprung load spreader 780 and/or the complaint material (as described above for the upper facial support 442 and the central facial support 472), the elongated roller 580, the spherical roller 680, and the gimbal 880 (as referenced above for the upper facial support 442 and the central facial support 472, and described in detail below with respect to the lower facial supports 462). In one specific example, the upper facial supports 442 is formed with the sprung load spreader 780 and/or the compliant material, the central facial support 472 is a roller (e.g., with suitable length of the elongated roller 580 described below), and the lower facial supports 462 are gimbals (e.g., the gimbal 880 or variations thereof described below). In other examples, the central facial support 472 and the lower facial supports 462 are of different types selected from the group consisting of the support mechanisms described below.

The facial interface 130 may further include or otherwise form a light seal 470, which engages the face 10 to block environmental light from reaching the eyes of the user. The facial interface 130 is formed of a compliant material that conforms to the face of the user and may, as shown, surround the upper portion 240 and the lower portion 260 of the facial interface 130. For example, the facial interface 130 may extend laterally above the upper portion 240, laterally below the lower portion 260, and form the side portions 250 of the facial interface by extending therebetween. In such configurations, the light seal 470 is highly compliant and engages the face 10 of the user with generally negligible force as compared to the upper portion 240 and/or the lower portion 260 of the facial interface 130. To ensure contact between the light seal 470 and the face 10, the light seal 470 protrudes rearward of the upper portion 240 and the lower portion of the facial interface 130 in relaxed states thereof. Due to the high compliance of the light seal 470, the side normal force 52, the side vertical shear force 54, and the side horizontal shear force 56 applied by the side portions 250 of the facial interface 130 to the side facial regions 50 may be relatively low (e.g., negligible) compared to the forces applied by the upper portion 240 and/or the lower portion 260 to the face 10 of the user. The light seal 470 may be coupled to the chassis 432 of the facial interface 130 or couple directly to the housing 112 of the display assembly 110. The light seal 470 is formed of one or more compressible, elastic, and/or flexible materials that conform to the face 10 of the user, such as a foam, elastomeric material (e.g., rubber or silicone), and/or fabric. Instead of the light seal 470 surrounding upper portion 240 and/or the lower portion 260 of the facial interface 130, the light seal 470 may be formed cooperatively with one, the other, or both (e.g., the upper portion 240 may form the light seal 470). The light seal 470 may also be referred to as a compliant seal.

Referring to FIGS. 5A-8C, the lower facial support 462 may be configured in different manners to provide the force distribution and compliance described above. As referenced above, the upper facial support 442 and the central facial support 472 may also be configured in the manners described below for the lower facial support 462. Discussed below are different types of support mechanisms that may be used as any of the facial supports, which include an elongated roller 580, a spherical roller 680, a sprung load spreader 780, and a gimbal 880.

Figure 5A:
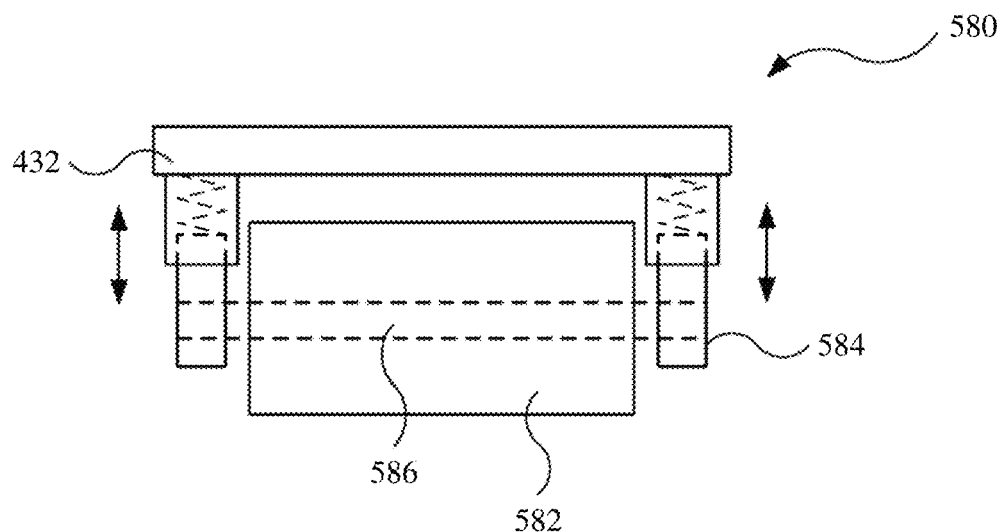
FIG. 5A is a top view of an embodiment of a facial support for the facial interface of FIG. 4A.
Figure 5B:
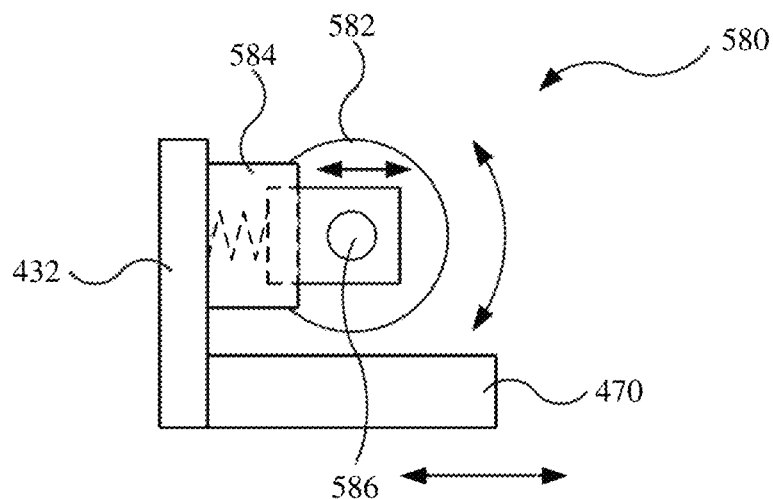
FIG. 5B is a side view of the facial support of FIG. 5A.

Referring to FIGS. 5A-5B, in an embodiment, the lower facial support 462 is the elongated roller 580. The elongated roller 580 generally includes a rolling contact 582 and two arms 584. The rolling contact 582 is supported by the two arms 584 and rotates relative thereto with low friction about an axis 586 that extends in a shear direction relative to the face 10 of the user (e.g., horizontally). The rolling contact 582, being supported by the two arms 584 rearward of the display assembly 110, engages the face 10 of the user and rolls along the surface thereof to provide a low-magnitude shear force component in the direction perpendicular to the axis 586 (e.g., lower vertical shear force 64). The elongated roller 580 may also be referred to as a pivot mechanism due to the pivoting or rotation of the rolling contact 582 about the axis 586.

The rolling contact 582 may be shaped in different manners, including as a cylinder (as shown) or instead with a variable radius moving along the axis 586 (e.g., being convex) and/or by not fully circumscribing the axis 586 (e.g., extending 180 degrees therearound). An outer surface of the rolling contact 582 may be generally rigid (e.g., to not compress axially and/or bend in response to forces applied by the face 10 thereto) or may be radially compliant (e.g., compressing to conform to the shape of the face 10), such as by including or being formed by a foam or elastomeric material (e.g., silicone).

The arms 584 may, as shown, be independently compliant in the normal direction, such that the ends of the rolling contact 582 (e.g., of the axis 586) may move toward and/or away from the display assembly 110 different distances to provide normal compliance (e.g., axial compliance). This also allows the axis 586 to change angle relative to the display assembly 110. For example, as shown, each of the arms 584 may be spring mechanisms (e.g., having a sliding post that is normally biased outward by a spring) or themselves be springs. The arms 584 are coupled to the chassis 432 of the facial interface 130 (as shown) or may alternatively be coupled directly to the display assembly 110. In another embodiment, the arms 584 may form a rigid unit that is compliant in the normal direction, such that the ends of the contact 582 (e.g., of the axis 586) may move toward and/or away from the display assembly 110 the same distance to provide normal compliance (e.g., axial compliance), while holding the axis 586 at a fixed angle relative to the display assembly 110. In a still further embodiment, the arms 584 may be positionally fixed relative to the display assembly 110, while normal compliance may be provided by the contact 582 itself (e.g., if formed of a compliant material).

The arms 584 may or may not (as shown) provide shear compliance in the shear direction parallel with the axis 586 (e.g., in the horizontal direction), thereby providing lateral stability to the display assembly 110.

Figure 6A:
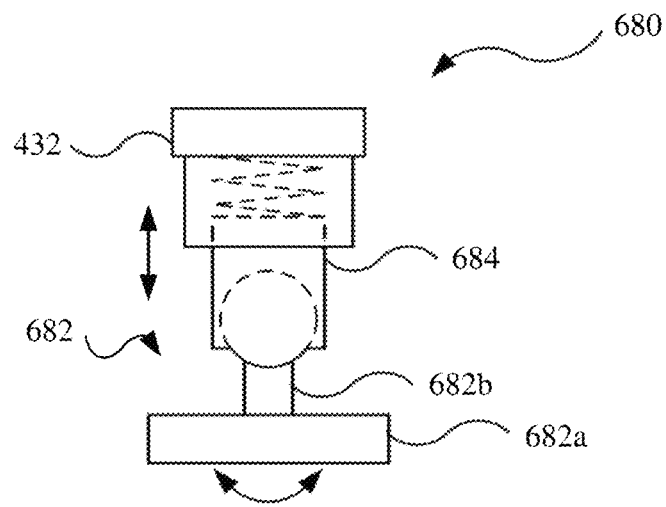
FIG. 6A is a top view of another embodiment of a facial support for the facial interface of FIG. 4A.
Figure 6B:
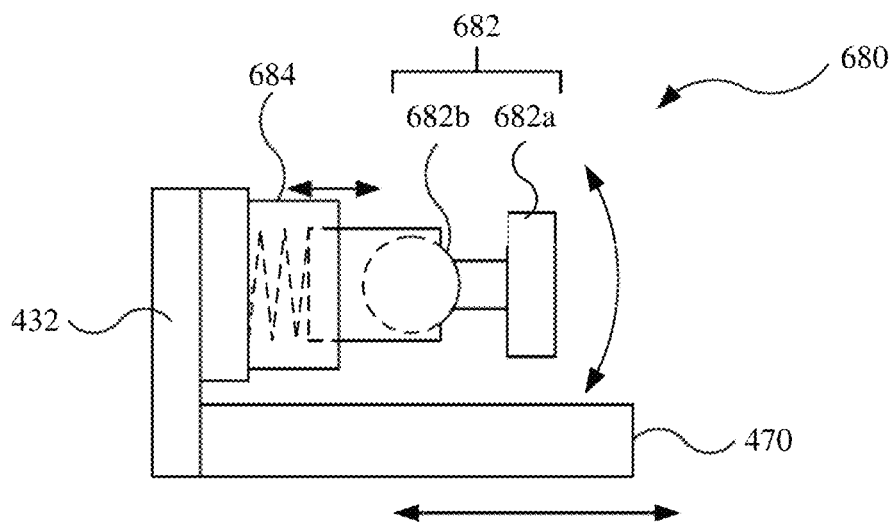
FIG. 6B is a side view of the facial support of FIG. 6A.

Referring to FIGS. 6A-6B, in another embodiment, the lower facial support 462 is the spherical roller 680. The spherical roller 680 generally includes a contact 682 and a spherical joint 684. The contact 682 is pivotally supported by the spherical joint 684. The contact 682 is movable in the shear directions (e.g., vertically, horizontally, and directions therebetween) relative to the spherical joint 684 and, thereby, relative to the display assembly 110. The contact 682 includes, for example, a contact surface 682a coupled to a link 682b. The contact surface 682a engages the face 10 of the user and may be formed of a rigid material that does not conform to the face 10, or a compliant material (e.g., foam or elastomer, such as silicone) that conforms to the shape of the face 10 (e.g., when the shape is static and/or changing). The spherical roller 680 may also be referred to as a pivot mechanism due to the pivoting of the contact 682 relative to the spherical joint 684.

The link 682b is a generally rigid structure (e.g., an arm) that extends from the contact surface 682a to the spherical joint 684. The link 682b is coupled to the spherical joint 684 in a manner to allow movement of the contact surface 682a relative to the display assembly 110 in shear directions with low resistance. The resistance and/or the range of displacement may vary in different shear directions (e.g., with lower resistance and/or greater range in the vertical shear direction than in the horizontal shear direction).

As is shown, the end of the link 682b and the spherical joint 684 form a ball-and-socket joint with the link 682b being received by the spherical joint 684. Alternatively, the spherical joint 684 may be received in the end of the link 682b to form the ball-and-socket joint.

The spherical roller 680 is further configured to provide normal compliance, such that the distance between the contact surface 682a and the display assembly 110 may change independent of any pivoting of the contact 682 relative to the spherical joint 684. For example, as is shown, the spherical joint 684 may be a spring mechanism (e.g., having a sliding post that is normally biased outward by a spring), which is coupled to the chassis 432 of the facial interface 130 (as shown) or may alternatively be coupled directly to the display assembly 110. Alternatively, the spherical joint 684 may be rigidly coupled to either the chassis 432 of the display assembly 110, while the link 682b of the contact 682 provides the normal compliance (e.g., by being a compressible shaft). In a still further alternative, the contact surface 682a may provide the normal compliance (e.g., with the link 682b and the spherical joint 684 not providing normal compliance).

Figure 7A:
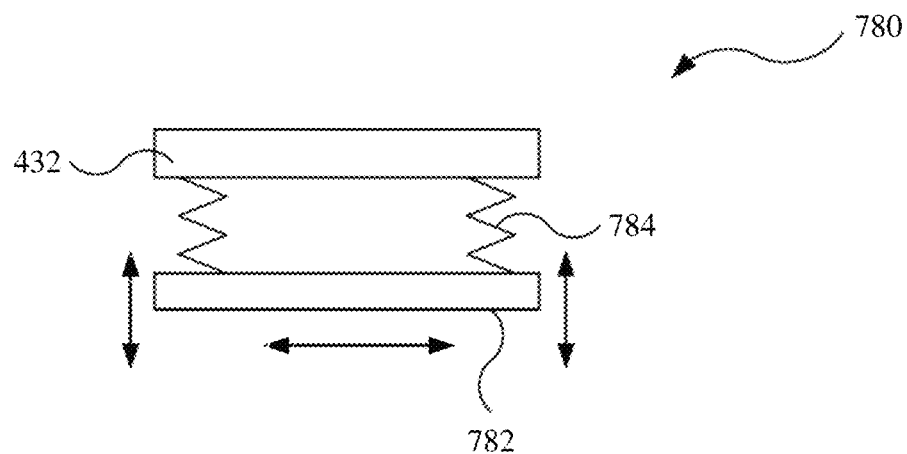
FIG. 7A is a top view of another embodiment of a facial support for the facial interface of FIG. 4A.
Figure 7B:
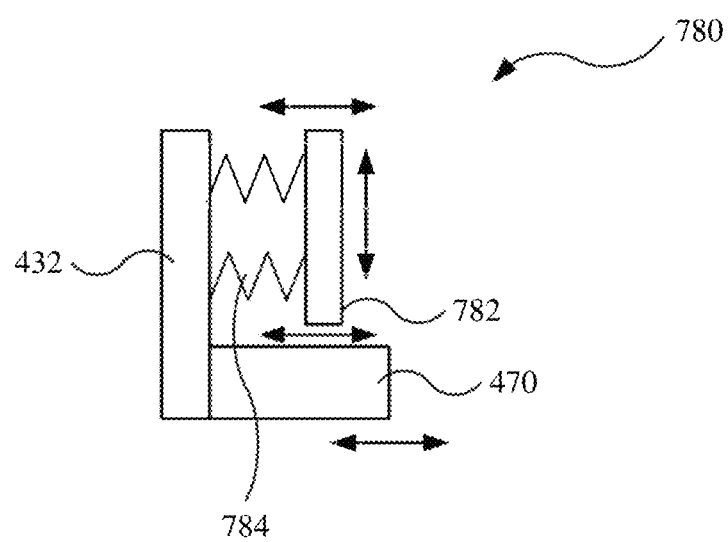
FIG. 7B is a side view of the facial support of FIG. 7A.

Referring to FIGS. 7A-7B, in another embodiment, the lower facial support 462 is the sprung load spreader 780. The sprung load spreader 780 generally includes a contact 782 and one or more springs 784 (e.g., four as shown) coupled thereto and in turn coupled to the chassis 432 of the facial interface 130 or directly to the display assembly 110. The contact 782, being coupled to and supported by the two springs 784 rearward of the display assembly 110, engages the face 10 of the user. The contact 782 is a generally rigid member but may include a compliant surface (e.g., formed of foam or silicone) that engages the face 10 and conform thereto. While shown as being generally rectangular and planar, the contact 782 may have any suitable shape and/or contour (e.g., being recessed).

The springs 784 provide the normal compliance and are independently compressible, such that different parts of the contact 782 may move different distances relative to the chassis 432 and/or the facial interface 130. Furthermore, the springs 784 may be configured to provide shear compliance in the manners described above. For example, the springs 784 may be coil compression springs that have low bending stiffness in the shear directions relative to the axial stiffness, such that force transfer in the shear directions is relatively low (i.e., providing low shear stiffness). Alternatively, shear movement of the contact 782 may be constrained in one or more of the shear directions (e.g., horizontally). For example, the spring mechanisms of the arms 584 may be used to mount the contact 782 to the chassis 432 or the display assembly 110. Still further, shear stiffness may differ between the shear directions, for example, having higher horizontal shear stiffness than vertical shear stiffness, which may be provided by the geometry of the springs 784 (e.g., a plate spring that may be stiffer in one shear direction over another).

In further embodiments, the sprung load spreader 780 may user more or fewer of the springs 784. In one specific example, the sprung load spreader 780 includes only one of the springs 784.

Referring to FIGS. 8A-8C, in another embodiment, the lower facial support 462 is the gimbal 880. As shown, the gimbal is a three-axis gimbal having a contact 882 coupled to the chassis 432 or directly to the display assembly 110 via three links 884a, 884b, 884c and three rotating joints 886a, 886b, 886c. The three rotating joints 886a, 886b, 886c define the three rotating axes of the gimbal 880, which may be generally perpendicular to each other, such as a vertical axis, a horizontal longitudinal axis (i.e., extending front to back), and a horizontal lateral axis (i.e., extending left to right). With the three links 884a, 884b, 884c extending between the rotating joints 886a, 886b, 886c and the contact 882, the three axes may be non-intersecting (i.e., due to lengths of the links 884a, 884b, 884c), such that rotation thereabout allows displacement of the contact 882 in the normal and shear directions. For example, the vertical axis allows for movement of the contact 882 in the normal and lateral shear directions, the horizontal longitudinal axis allows for movement of the contact 882 in the horizontal and vertical shear directions, and the horizontal lateral axis allows for movement of the contact 882 in the normal and vertical shear directions. The gimbal 880 may also be referred to as a pivot mechanism due to the pivoting of the links 884a, 884b, 884c and the contact 882 relative to the rotating joints 886a, 886b, 886c.

Furthermore, in the example illustrated in FIGS. 8A-8C, in a base orientation of the gimbal 880, each axis may allow for movement of the contact in predominantly one of the normal, vertical shear, or horizonal shear directions. A first rotating joint 886a is coupled to the chassis 432 of the facial interface 130 or directly to the display assembly 110 and has a horizontal lateral axis of rotation. In the base configuration, a first link 884a extends vertically upward from the first rotating joint 886a, such that rotation about horizontal lateral axis of the first rotating joint 886a results in movement of the end of the first link 884a and the contact 882 in a predominantly normal direction (see FIG. 8C). A second rotating joint 886b is coupled to the first link 884a and has horizontal normal axis of rotation. In the base configuration, a second link 884b extends horizontally laterally from the upward from the second rotating joint 886b, such that rotation about the horizontal normal axis of the first rotating joint 886a results in movement of the end of the second link 884b and the contact 882 in a predominantly vertical direction (see FIG. 8A). A third rotating joint 886c is coupled to the second link 884b and has a vertical axis of rotation. In the base configuration, a third of the links 884c extends horizontally normally from the third rotating joint 886c and is coupled to the contact 882, such that rotation about horizontal normal axis of the third rotating joint 886c results in movement of the end of the second link 884b and the contact 882 in a predominantly horizontal shear direction (see FIG. 8B).

Each of the rotating joints 886a, 886b, 886c may include a spring (e.g., a torsion spring; not shown) by which torque is applied between the links 884a, 884b, 884c coupled thereto, which in turn apply the normal force 62, the lower vertical shear force 64, and the horizontal shear force 66 between the contact 882 and the face 10 of the user in the manners described previously (e.g., with negligible vertical shear force in some embodiments).

In variations of the gimbal 880, the gimbal 880 may include only two of the rotating joints 886a, 886b, 886c, while still being considered a multi-axis gimbal. Further, while the pivot axes formed by the rotating joints 886a, 886b, 886c of the gimbal 880 are depicted as not intersecting, two or more of the pivot axes formed by the rotating joints 886a, 886b, 886c may intersect each other (e.g., by omitting one of the links 884a, 884b, 884c), so as to constrain movement in one or more directions. For example, by eliminating or shortening the third link 884c, horizontal shear movement may be largely constrained.

Figure 9:
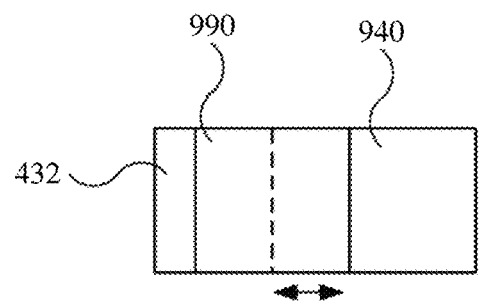
FIG. 9 is a partial side view of a facial interface having a position adjustment mechanism.

Referring to FIG. 9, one or more of the upper facial support 442, the lower facial support 462, and/or the central facial support 472 may be adjustable in the normal direction, so as to accommodate different facial shapes and ensure proper positioning of the electronic display 114 relative to the eye of the user (e.g., a predetermined position or range along optical axis). For example, one or more of the upper facial support 442, the lower facial support 462, and/or the central facial support 472 may be movable between two or more predetermined positions or positions within a range of movement (compared solid and dashed lines) in which such facial support is fixed. Movement between the different positions will generally not change the compliance characteristics of such facial supports.

To provide position adjustability in the normal direction, the head-mounted display unit 100 or the facial interface 130 may include one or more normal position adjustment devices 990 that allow the facial support 940 (e.g., one of the facial supports 442, 462, 472, which may be any of the support mechanisms) associated therewith (e.g., coupled thereto) to change their respective normal positions relative to the housing 112 of the head-mounted display unit 100. The normal position adjustment devices 990 may be active devices (e.g., that are operated with electronic controls) or passive devices (e.g., that are manually operated by physical manipulation by the user). Active forms of the normal position adjustment device 990 may include electronically-controlled screws, levers, solenoids, pneumatic, and/or hydraulic devices, which are selectively operated by a control system. Passive forms of the normal position adjustment device 990 may, for example, include manually operated screws, levers, ratcheting mechanisms, or bladders with releasable air or water.

The range of movement of the normal position adjustment devices 990 may be within an order of magnitude of the range of displacement (e.g., compressible distance) of the support mechanisms (e.g., being between 0.2 and 5 times thereof, such as between 0.5 and 2 times thereof). For example, the one or more support mechanisms 580, 680, 780, 880 may have a range of displacement and the normal position adjustment devices 990 may have a range of movement of between 2 mm and 15 mm, such as between 4 mm and 10 mm (e.g., between 6 mm and 8 mm).

Figure 10:
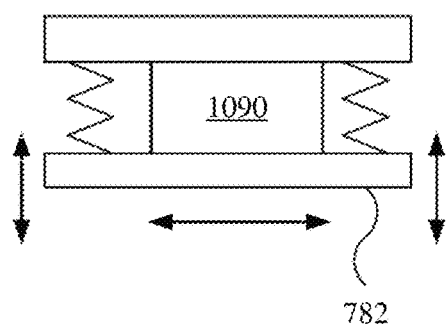
FIG. 10 is a partial top view of a support mechanism having selective stiffness.

Referring to FIG. 10, one or more of the support mechanisms (e.g., the upper facial support 442, the lower facial support 462, and/or the central facial support 472, which may be any of the support mechanisms) may be operable to selectively increase stiffness, for example, in response to high-magnitude acceleration of the user's head and to maintain the relative position of the head-mount display unit 100 to the face 10 of the user. Such stiffness may be increased in one or more of the normal, vertical shear, and/or horizontal directions (e.g., vertically, longitudinally such as in the fore-aft direction, or laterally such as in the left-right direction). To increase stiffness, the facial support mechanism includes one or more selective stiffness devices 1090 (depicted schematically with respect to the sprung load spreader 780 as an example), which are configured to selectively increase the stiffness of the facial support mechanism as operated by a control system. The one or more selective stiffness devices 1090 may each be associated with one or more of the degrees of freedom of the facial support mechanism, such as rotation and/or displacement thereof. Examples, of selective stiffness devices 1090 include friction or locking brake devices, magnetorheological fluid devices, magnet devices, each which is configured to directly hinder or prevent movement between components of the facial support mechanism or directly hinder or prevent movement between the facial engagement component thereof and the chassis 432 of the facial interface 130.

Figure 11:
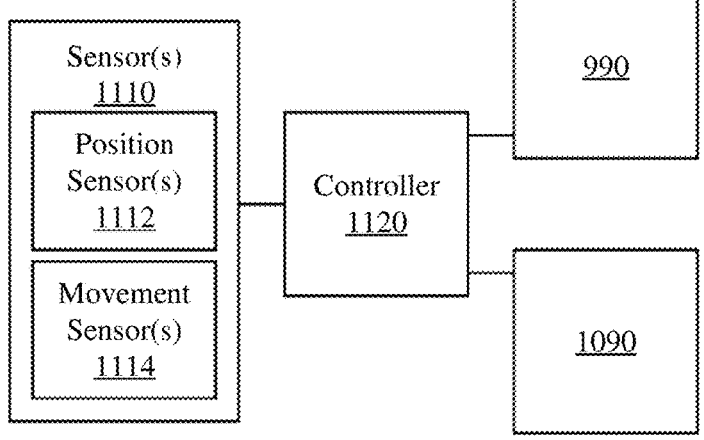
FIG. 11 is a schematic view of a control system.

Referring to FIG. 11, the head-mount display unit 100 includes a control system 1100 that is used for operating the normal position adjustment devices 990 and/or the selective stiffness devices 1090 (if provided). The control system 1100 includes one or more sensors 1110 and a controller 1120 in communication with the one more sensors 1110 and the normal position adjustment devices 990 and/or the selective stiffness devices 1090.

The sensors 1110 may include one or more position sensors 1112 that are configured to determine a relative position between the head-mounted display unit 100 or a component thereof and the eye of the user to determine whether the electronic display 114 is in a predetermined position relative to the eye of the user. The one or more position sensors 1112 may, for example, include range detection devices and/or one or more cameras, while the controller 1120 employs suitable optical recognition techniques for determining the relative position. The controller 1120 operates the normal position adjustment devices 990 to move the electronic display 114 to the predetermined position relative to the eye of the user according the one or more position sensors 1112, such as according to the determination of the relative position of the head-mounted display unit 100 relative to the eye of the user made therewith. In an implementation, a controller is configured to operate the selective stiffness device to change the stiffness of the lower facial support based on an output from a sensor.

The sensors 1110 may include one or more movement sensors 1114 that are configured to determine movement of the head of the user in real space (e.g., acceleration and/or rotational velocity). The one or more movement sensors 1114 may, for example, include a single or multi-axis accelerometer and/or gyroscope. The controller 1120 operates the one or more selective stiffness devices 1090 to hinder or prevent movement of the head-mounted display unit 100 (e.g., the electronic display 114) and the face 10 of the user (e.g., the eye thereof), for example, increasing the stiffness upon detection of acceleration and/or rotational velocity exceeding threshold values. In an implementation, the sensor is configured to determine movement of the head of the user, and the controller is configured to operate the selective stiffness device to increase the stiffness of the lower facial support in response to the output from the sensor indicating the movement of the head of the user.

Figure 12:
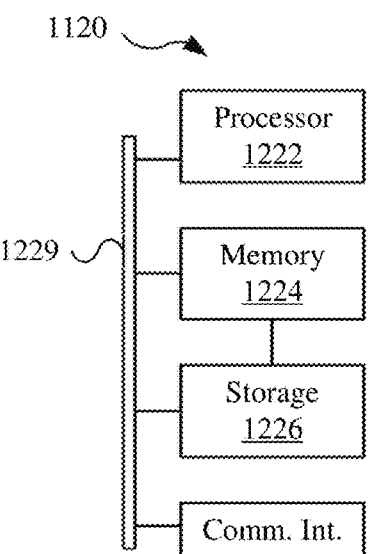
FIG. 12 is a schematic view of an example hardware configuration for a controller of the control system.

The controller 1120 may be any suitable computing device or system capable of implementing the systems and methods described herein. FIG. 12 illustrates one example hardware configuration of the controller 1120, though any other suitable hardware configuration may be used. The controller 1120 may generally include a processor 1222, a memory 1224, a storage 1226, a communications interface 1228, and a bus 1229 enabling communication therebetween. The processor 1222 may be any suitable processing device, such as a central processing unit (CPU), capable of performing instructions (e.g., software programming). The memory 1224 is volatile, high-speed memory device, such as a random-access memory unit. The storage 1226 is a non-volatile memory device, such as a solid state drive. The communications interface 1228 allows the controller 1120 to communicate with other devices, for example, sending and/or receiving signals therewith (e.g., the sensors 1110, the normal position adjustment device 990, or the selective stiffness device 1090).

A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality.

A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality.

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

As described above, one aspect of the present technology is the gathering and use of data available from various sources, for example, to provide a computer generated reality. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to provide content to a user. Accordingly, use of such personal information data enables users to calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In another example, users can select not to provide such personal information. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be delivered to users by inferring from inferences based on non-personal information data or a bare minimum amount of personal information, such as the content being requested by the device associated with a user, other non-personal information available from other sources, or publicly available information.

EMBODIMENTS

In addition to the embodiments enumerated in the claims with further support in the foregoing description, the following embodiments are also contemplated:

Embodiment 1. A head-mounted display to be worn on a head of a user comprising:
  a display assembly having a display; and
  a facial interface coupled to the display assembly for supporting the display assembly on a face of the user, the facial interface having a first facial support that engages an upper facial region above eyes of the user and a second facial support that engages a lower facial region below the eyes of the user;
  wherein in a reference position in which the head-mounted display is worn on the head of the user and the user is upright and looking forward, a first vertical stiffness provided by the first facial support between the display assembly in a vertical direction and the upper facial region is less than a second vertical stiffness provided by the second facial support between the display assembly and the lower facial region in the vertical direction.

Embodiment 2. The head-mounted display according to Embodiment 1, further comprising a head interface coupled to the display assembly that engages the head of the user to support the display assembly, wherein in the reference position, the head interface is in tension and compresses the facial interface between the display assembly and the face of the user; and further comprising a light seal that conforms to the face of the user to block environmental light from reaching the eyes of the user, the light seal extending below the second facial support;
wherein in the reference position, a first fore-aft range of displacement provided by the first facial support between the display assembly and the upper facial region in a fore-aft direction is less than a second fore-aft range of displacement provided by the second facial support between the display assembly and the lower facial region in the fore-aft direction, a first fore-aft stiffness provided by the first facial support between the display assembly and the upper facial region in the fore-aft direction is greater than a second fore-aft stiffness provided by the second facial support between the display assembly and the lower facial region in the fore-aft direction, and a first vertical range of displacement provided by the first facial support between the display assembly and the upper facial region in the vertical direction is less than a second vertical range of displacement provided by the second facial support between the display assembly and the lower facial region in the vertical direction.

Embodiment 3. The head-mounted display according to Embodiment 2, wherein in the reference position, a first fore-aft force applied between the facial interface and the upper facial region in the fore-aft direction is greater than a second fore-aft force applied between the facial interface and the lower facial region in the fore-aft direction, a first vertical force applied between the facial interface and the upper facial region in the vertical direction is greater than a second vertical force applied between the facial interface and the lower facial region in the vertical direction, and a first ratio of the first vertical force to the first fore-aft force is greater than a second ratio of the second vertical force to the second fore-aft force.

Embodiment 4. The head-mounted display according to Embodiment 1, wherein in the reference position, a first fore-aft range of displacement provided by the first facial support between the display assembly and the upper facial region in a fore-aft direction is less than a second fore-aft range of displacement provided by the second facial support between the display assembly and the lower facial region in the fore-aft direction.

Embodiment 5. The head-mounted display according to Embodiment 4, wherein in the reference position, a first fore-aft stiffness provided by the first facial support between the display assembly and the upper facial region in the fore-aft direction is greater than a second fore-aft stiffness provided by the second facial support between the display assembly and the lower facial region in the fore-aft direction.

Embodiment 6. The head-mounted display according to Embodiment 5, wherein in the reference position, a first vertical range of displacement provided by the first facial support between the display assembly and the upper facial region in the vertical direction is less than a second vertical range of displacement provided by the second facial support between the display assembly and the lower facial region in the vertical direction.

Embodiment 7. The head-mounted display according to Embodiment 1, wherein in the reference position, a first fore-aft force applied between the facial interface and the upper facial region in a fore-aft direction is greater than a second fore-aft force applied between the facial interface and the lower facial region in the fore-aft direction.

Embodiment 8. The head-mount display according to Embodiment 7, wherein in the reference position, a first vertical force applied between the facial interface and the upper facial region in the vertical direction is greater than a second vertical force applied between the facial interface and the lower facial region in the vertical direction.

Embodiment 9. The head-mounted display according to Embodiment 8, wherein a first ratio of the first vertical force to the first fore-aft force is greater than a second ratio of the second vertical force to the second fore-aft force.

Embodiment 10. The head-mounted display according to Embodiment 1, further comprising a head interface coupled to the display assembly and that engages the head of the user to support the display assembly thereon, wherein in the reference position, the head interface is in tension and compresses the facial interface between the display assembly and the face of the user.

Embodiment 11. The head-mounted display according to Embodiment 1, further comprising a light seal that conforms to the face of the user below the second facial support to block environmental light from reaching the eyes of the user.

What is claimed is:
1. A facial interface for a head-mounted display to be worn on a head of a user, the facial interface comprising:
   a chassis;
   an upper portion coupled to the chassis and configured to engage an upper facial region above eyes of the user; and
   a lower portion that includes a lower facial support coupled to the chassis and configured to engage a lower facial region below the eyes of the user, the lower facial support including:
      a rolling contact defining an axis;
      a first arm coupled to the chassis and supporting the rolling contact; and
      a second arm coupled to the chassis and supporting the rolling contact,
   wherein the rolling contact is configured to rotate about the axis relative to the first arm and the second arm to allow displacement of the lower facial support relative to the lower facial region of the user.

2. The facial interface of claim 1, wherein the rolling contact is configured to rotate about an axis relative to the first arm and the second arm to provide a lower shear range of displacement of the lower portion that is greater than an upper shear range of displacement of the upper portion.

3. The facial interface of claim 2, wherein the lower shear range of displacement is in a direction perpendicular to the axis.

4. The facial interface of claim 1, wherein the first arm and the second arm are movable toward and away from the chassis to provide a lower normal range of displacement of the lower portion.

5. The facial interface of claim 4, wherein the lower normal range of displacement of the lower portion that is greater than an upper normal range of displacement of the upper portion.

6. The facial interface of claim 4, wherein the rolling contact is configured to rotate about an axis relative to the first arm and the second arm, and wherein the first arm and the second arm are individually movable such that ends of the rolling contact are individually movable toward and away from the chassis to change an angle of the axis relative to the chassis.

7. The facial interface of claim 4, wherein the rolling contact includes an outer surface that is generally rigid.

8. The facial interface of claim 7, wherein the first arm and the second arm are positionally fixed relative to the chassis.

9. The facial interface of claim 1, wherein the rolling contact is configured to extend in a shear direction relative to the lower facial region of the user.

10. The facial interface of claim 1, wherein the lower facial support further includes:
a selective stiffness device configured to selectively change a stiffness of the lower facial support.

11. A facial interface for a head-mounted display to be worn on a head of a user, the facial interface comprising:
a chassis;
an upper portion coupled to the chassis and configured to engage an upper facial region above eyes of the user; and
a lower portion that includes a lower facial support coupled to the chassis and configured to engage a lower facial region below the eyes of the user, the lower facial support including:
an arm coupled to the chassis and movable toward and away from the chassis;
a pivot mechanism supported by the arm, the pivot mechanism configured to pivot in response to movement of the lower facial region of the user; and
a selective stiffness device configured to selectively hinder at least one of:
movement of the pivot mechanism relative to the arm, and
movement of the pivot mechanism relative to the chassis.

12. The facial interface of claim 11, wherein the pivot mechanism is configured to rotate about an axis relative to the arm to provide a lower shear compliance of the lower portion, and wherein the lower shear compliance of the lower portion is greater than an upper shear compliance of the upper portion.

13. The facial interface of claim 11, wherein the arm is movable toward and away from the chassis to provide a lower normal compliance of the lower portion, and wherein the lower normal compliance of the lower portion is greater than an upper normal compliance of the upper portion.

14. The facial interface of claim 11, wherein the selective stiffness device is configured to hinder at least one of movement of the pivot mechanism relative to the arm and movement of the pivot mechanism relative to the chassis in response to movement of the head of the user.

15. The facial interface of claim 11, wherein the selective stiffness device comprises at least one of a friction device, a locking brake device, a magnetorheological fluid device, or a magnet device.

16. A facial interface for a head-mounted display to be worn on a head of a user, the facial interface comprising:
a display assembly;
an upper portion coupled to the display assembly and configured to engage an upper facial region above eyes of the user; and
a lower portion that includes a lower facial support coupled to the display assembly and configured to engage a lower facial region below the eyes of the user, the lower facial support including a selective stiffness device that is configured to selectively change a stiffness of the lower facial support,
wherein a controller is configured to operate the selective stiffness device to change the stiffness of the lower facial support based on an output from a sensor.

17. The facial interface of claim 16, wherein the sensor is configured to determine movement of the head of the user, and the controller is configured to operate the selective stiffness device to increase the stiffness of the lower facial support in response to the output from the sensor indicating the movement of the head of the user.

18. The facial interface of claim 17, wherein the movement of the head of the user comprises an acceleration of the head of the user.

19. The facial interface of claim 18, wherein the movement of the head of the user comprises a rotational velocity of the head of the user.

20. The facial interface of claim 16, wherein the selective stiffness device is configured to selectively change the stiffness of the lower facial support by hindering movement between components of the lower facial support.

* * * * *